(12) United States Patent
Candelieri et al.

(10) Patent No.: US 7,614,133 B2
(45) Date of Patent: Nov. 10, 2009

(54) METHOD FOR CLOSING A HYDRAULIC, PNEUMATIC AND/OR OLEOPNEUMATIC CYLINDER AND MEANS FOR IMPLEMENTING THEREOF

(75) Inventors: Tommaso Candelieri, Policoro (IT);
Giovanni Rovina, Viadana (IT); Donato Carcagni', Martignano (IT)

(73) Assignee: Karborek S.r.l., Pignola (PZ) (IT)

( * ) Notice: Subject to any disclaimer, the term of this patent is extended or adjusted under 35 U.S.C. 154(b) by 638 days.

(21) Appl. No.: 10/514,319

(22) PCT Filed: Apr. 23, 2003

(86) PCT No.: PCT/IT03/00255

§ 371 (c)(1),
(2), (4) Date: Aug. 24, 2005

(87) PCT Pub. No.: WO03/097269

PCT Pub. Date: Nov. 27, 2003

(65) Prior Publication Data

US 2006/0075622 A1    Apr. 13, 2006

(30) Foreign Application Priority Data

May 15, 2002    (IT) .......................... RM2002A0268

(51) Int. Cl.
*B21D 39/00* (2006.01)
*B23P 11/02* (2006.01)
(52) U.S. Cl. .......................................... 29/508; 29/451

(58) Field of Classification Search .................... 29/451,
29/505, 508, 516, 517, 283.5, 510, 237; 285/256;
403/285, 274, 282; 72/121
See application file for complete search history.

(56) References Cited

U.S. PATENT DOCUMENTS

| 2,000,680 | A | * | 5/1935 | Weatherhead Jr. | ........... 29/508 |
| 2,487,512 | A | | 11/1949 | Berger | |
| 2,957,734 | A | * | 10/1960 | McLeod | ........... 29/516 |
| 3,068,563 | A | * | 12/1962 | Reverman | ........... 29/517 |
| 3,811,367 | A | | 5/1974 | Bimba | |
| 4,791,712 | A | | 12/1988 | Pees et al. | |

FOREIGN PATENT DOCUMENTS

EP             1 186 820           3/2002

* cited by examiner

*Primary Examiner*—John C Hong
(74) *Attorney, Agent, or Firm*—Young & Thompson

(57) ABSTRACT

Method for manufacturing a jack or hydraulic, pneumatic and/or oleopneumatic cylinder including a tubular cylindrical body at whose ends a bottom and a head are fastened Inside, a piston slides integral with a rod. In order to irremovably fasten the head and the bottom to the tubular body of the jack without threading and/or welding procedures, it includes at the end of the tubular body a controlled plastic deformation extended to the whole thickness of the tubular body itself, apt to locally deform the ends thereof by generating on each of them at least a circumferential ring radially projecting inwards so as to insert in at least a specific groove arranged on the bottom and on the head inserted in the tube itself, respectively, so as to lock them in sito. The plastic deformation guarantees the mechanical seal of the coupling between tube and bottom and tube and head.

9 Claims, 4 Drawing Sheets

METHOD FOR CLOSING A HYDRAULIC, PNEUMATIC AND/OR OLEOPNEUMATIC CYLINDER AND MEANS FOR IMPLEMENTING THEREOF

The present invention substantially relates to the manufacturing of hydraulic, pneumatic and oleopneumatic cylinders. More specifically, the invention relates to a process for "closing" cylinders by means of mechanical "rolling".

Currently, the manufacturing of jacks and hydraulic, pneumatic or oleopneumatic cylinders provides welding the bottom and the head to the tubular body of the cylinder itself, with evident labor and processing costs, as well as problems of inner tensions of the materials caused by the high temperatures locally reached during the welding procedures.

Other processes used for closing cylinders, such as for example coining and lamination, have shown serious drawbacks due both to the presence of not-in-tolerance crackings in the plastic deformation area which cause a production waste of about 20%, and to the dishomogeneity of the plastic deformation with consequent failure in locking and mechanical sealing involving a production waste of about 70%.

The main object of the present invention is to improve the implementing procedures, more precisely the step of closing hydraulic, pneumatic and oleopneumatic cylinders. This has been achieved, according to the invention, by providing a process which provides the elimination of welding and threading procedures, by replacing them with a particular processing of plastic deformation implemented by means of mechanical rolling.

Means for implementing the above mentioned process are also object of the present invention.

The inventive concept underlying the invention is to perform the "closing" of a cylinder or jack without threading and/or welding procedures in order to join the head and the bottom to the tubular body of the jack itself.

These procedures are easily and cheaply implemented by means of a particular locking/closing method which performs a "plastic" deformation controlled by a rolling process implemented by a specific apparatus.

According to the invention, in order to eliminate said drawbacks a mechanical rolling is provided implemented by a rolling machine equipped with a special, preferably multiroller, shaping head allowing to drastically reduce processing waste.

A better understanding of the invention will take place with the following description and by referring to the enclosed figures which illustrate a preferred embodiment, by simple way of example and not for limitative purpose.

In the drawings:

FIG. 1 schematically shows an exploded view of the components of a jack according to the invention;

FIG. 2 schematically shows the jack of FIG. 1 already assembled and closed, ready to be used;

The present invention allows eliminating, in the procedures for manufacturing jacks and hydraulic, pneumatic and oleopneumatic cylinders, the threading and welding mechanical procedures by replacing them with a particular rolling procedure.

Figure 1:
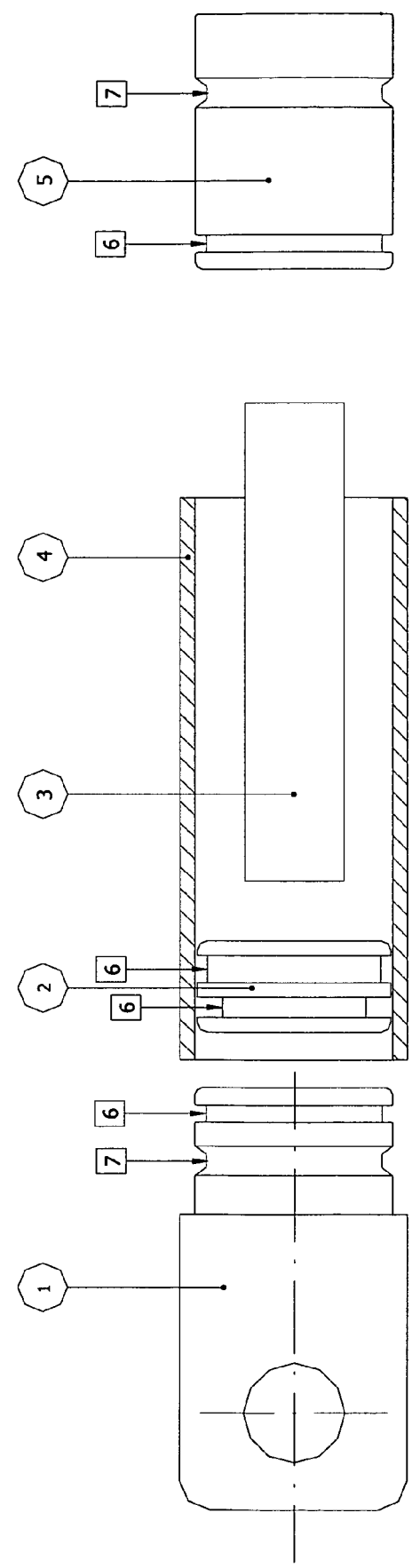

As it is know, a jack (FIGS. 1 and 2) is constituted by a bottom 1, a liner or tube 4, a piston is 2, a rod 3 and a head 5.

The bottom 1 and the head 5 must be fastened in an irremovable way to the liner 4: the first one operating as closing member of the cylinder or the jack itself, the second one as member allowing the sliding of the rod 3 pushed by the used liquid or gas. The rod 3, in turn, is obviously integral with the piston 2.

The latter, which is free to slide inside the liner or tube 4, is hydraulically or pneumatically sealed with one or more preferably ring-like (O-ring) gaskets G inserted in specific grooves 6 arranged on the piston 2 itself.

The same system of gaskets G and grooves 6 is utilized to guarantee the seal between the rod 3 and the head 5, as well as for the seal between bottom 1 and liner 4 and between head 5 and liner 4.

As it was already mentioned, in order to manufacture a jack several different methods are currently used utilizing two different techniques to join the head to the tube and the bottom to the tube: threading and welding. In practice, both techniques can be used both to fasten the bottom to the tube and the head to the tube, or more frequently the welding for anchoring the bottom to the tube and the threading for anchoring the head to the tube.

The welding procedure, in particular, apart from the time required for the implementation thereof, causes a stress to the tube 4 and deforms it, by reducing the average life time of the cylinder or the jack itself.

The rolling procedure according to the invention is performed by means of the above-mentioned mechanical rolling machine equipped with a special shaping multiroller head which, by properly acting on the tube, implements in an uniform, reproducible way and without crackings, a predetermined plastic deformation allowing the perfect mechanical seal in the coupling between tube 4 and bottom 1 and between tube 4 and head 5. To this purpose, the bottom and the head are equipped with at least a respective outer annular groove 7 wherein the deformed area of the tube 4 fits.

Figure 2:
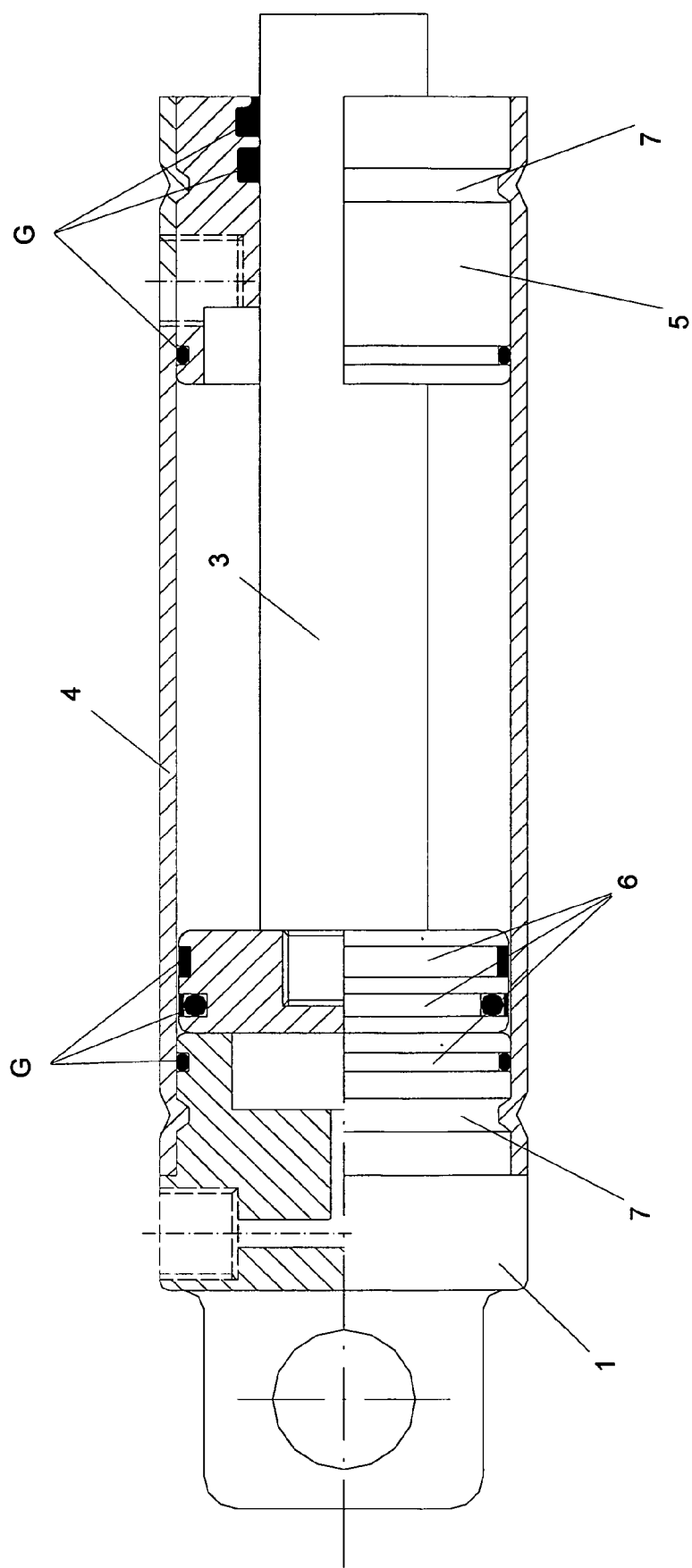

As shown by FIG. 2, the innermost groove 6 of the bottom 1 and that of the head 5 act as seat for the gasket G of appropriate material which guarantees the hydraulic or pneumatic seal, whereas the respective outer grooves 7 are apt to receive the material of the tube 4 which is "shifted" by plastic deformation with the mechanical rolling processing which is described.

Said plastic deformation of the tube or liner 4, in fact, forms an outer annular groove and a corresponding inner ring projecting in radial direction towards the axis of the tube itself, which ring, indeed, is apt to insert into a corresponding annular groove 7 arranged both on the bottom 1 and on the head 5.

Advantageously, the utilized mechanical processing guarantees a uniform contact, inside the grooves 7, between the tube 4 and the components (bottom 1 and head 5) fastened at the ends thereof.

Figure 6:
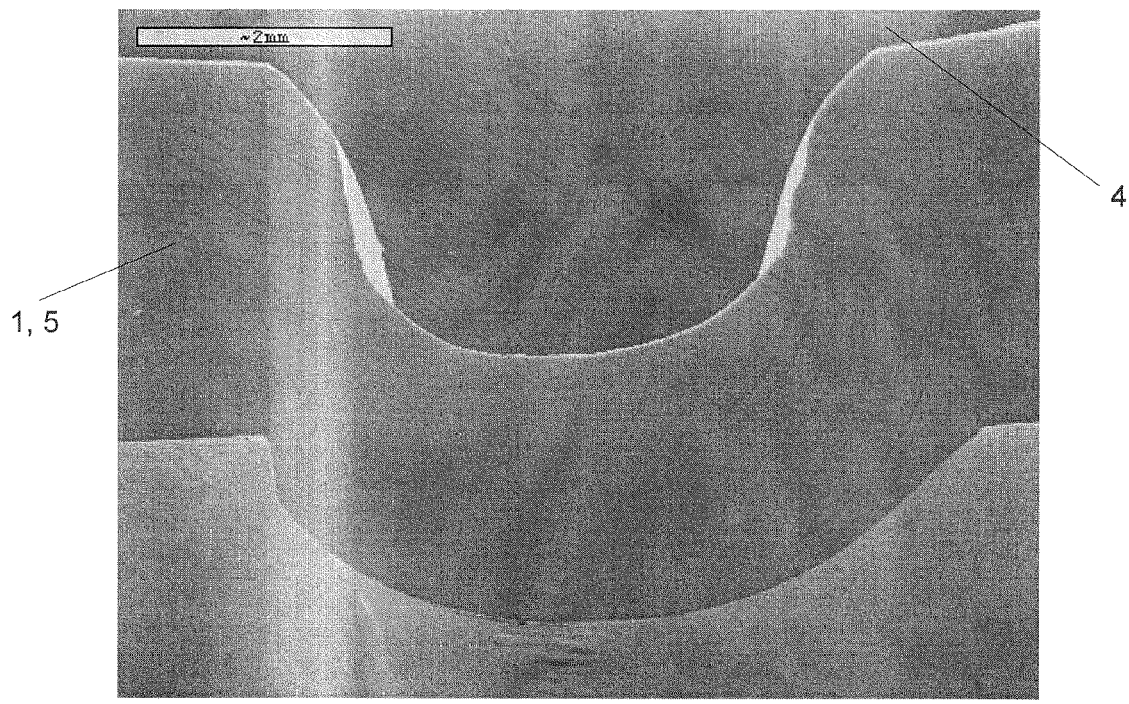
FIG. 6 is a low-enlarged photographic image of the section.

The processing quality has been checked by means of scan electron microscopy analysis on several tube samples. SEM observations have involved the outer surface, the inner surface and the manufact section which has been prepared for the observation with metallographic techniques. The survey has demonstrated that there are crackings only on the outer surface in very small quantities and they are limited to a depth lower than 10-20 μm; the inner surfaces do not have crackings. In FIG. 6 a low-enlarged image of a section of the junction area between tube and bottom or head is shown, made according to the longitudinal axis of the tube itself.

The mechanical rolling procedures are performed by anchoring the preassembled cylinder to the special shaping multiroller head TM implementing the closing procedure. The procedure can take place in cold and/or hot status, with variable pressures in a very wide range and with likewise very variable revolution speeds of the shaping rollers R1: said several parameters, upon setting up the production, have to be fastened according to sizes and thicknesses of the tube 4, features of the constituting material, etc.

The time for performing each rolling procedure varies from few seconds to a maximum of 50-60 seconds.

With respect to the solutions adopted up to now, the process which is described advantageously allows to securely anchor the bottom 1 and the head 5 to the tube 4 by reducing the production waste from values higher than 70% to values lower than 0.1%.

It is also to be pointed out that the experimental data on a prototype production of 2000 pieces have demonstrated an absolute reproducibility of the rolling processing with respect to the structural homogeinity of the involved tube area, to the dimensional reproducibility of the generated plastic deformation, to the complete and homogeneous "filling-up" of the locking seat 7 (FIG. 6). These conditions guarantee an optimum mechanical and hydraulic seal.

With the tests performed on the manufactured prototypes it has been found out that both the mechanical and hydraulic seal are better than the current products available on the market.

Furthermore, the average life of the product obtained according to the invention is longer than that of the currently known cylinders and jacks, since with the process sofar described the liner 4 is not subjected to deformations on allowances with the other components since no welding procedure has been performed.

From the operating point of view, the "rolling" process sofar described is performed as follows: a special shaping multiroller head TM of a rolling machine is positioned at the area of the tube or liner 4 wherein the plastic deformation must occur which generates the outer annular groove 7 thereto an inner annular jut of the liner itself corresponds, which radially projects towards the axis of the tube 4.

Once in position, the shaping rollers R1 are approached in an uniform and gradual way to the tube 4, along a radial direction.

During the approaching step to the tube 4, the rollers R1 symmetrically move in radial direction with respect to the cylinder and also have the same simultaneous rotating motion. In this way, once in contact with the tube 4 which is free to rotate about its own axis integrally with the bottom 1 and/or the head 5 positioned inside thereof, the rolling machine causes to the same, by means of an adequate pressure of the shaping rollers R1, a localized and predetermined annular plastic deformation (in cold or hot status).

Figure 5:
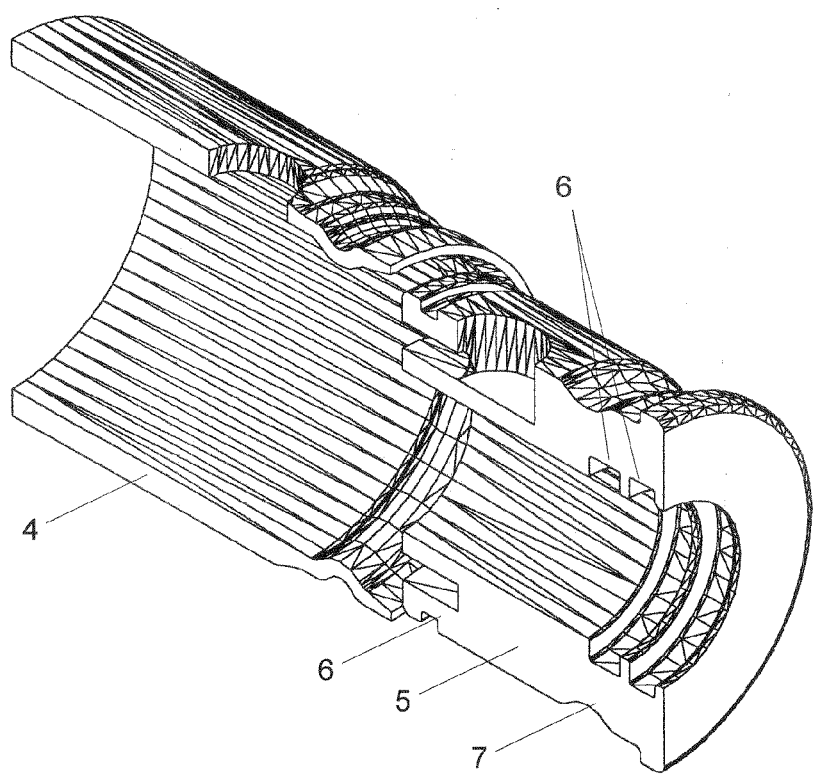
FIG. 5 is a tridimensional section showing an exploded view of the end part of the jack head after the deformation.

The rotating motion of the rollers R1 and, by the dragging effect, of the tube 4 (in opposite direction with respect to the rollers) makes such processing easier, by making optimum and constant the material shifting towards the inside of the corresponding groove 7 of the bottom 1 and/or of the head 5 by performing the locking thereof. FIG. 5 shows an exploded view wherein the deformation subjected by the tube 4 at the head 5 is clearly seen.

Such procedure avoids the cracking formation both outside and inside the tube 4 and allows an integral lock between tube and end components, without radial and/or axial slacks.

From what said, it is clear that the process which is described substantially comprises the steps of:

1. Placing the gaskets G inside the corresponding annular grooves 6 arranged on the bottom 1;
2. Inserting the bottom 1 in the predetermined position thereof at one end of the liner 4 of the jack;
3. Positioning the multiroller head TM at the above-mentioned first end of the tube 4;
4. Contemporaneously approaching the shaping rollers R1 to the outer cylindrical surface of the tube 4 and performing the plastic deformation by means of rolling;
5. Taking the shaping rollers R1 away from the cylinder;
6. Placing the gaskets G inside the corresponding annular grooves 6 arranged on the piston 2 integral with the rod 3;
7. Placing the gaskets G inside the corresponding annular grooves 6 arranged on the outer and inner cylindrical surface of the head 5;
8. Inserting the piston 2 inside the tube 4 as well as the head 5, already inserted onto the rod 3, in its predetermined position at a second end of the liner 4 of the jack;
9. Repeating the steps 3 to 6 with respect to the above-mentioned second end.

Obviously, it is also possible to exchange the sequence of steps to fasten first the head 5 and then the bottom 1.

Furthermore, it has just to be noted that it is also possible to provide two multiroller heads TM which contemporarily act on the two ends of the cylinders 4, after having placed the parts to be fastened and the piston 2 with the rod 3 into the corresponding correct positions, already equipped with gaskets G.

Figure 3:
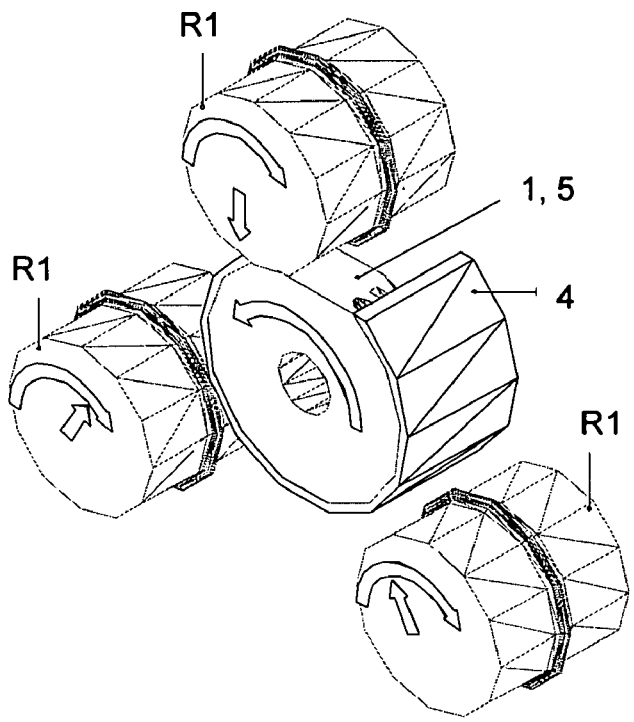
FIG. 3 is a perspective view illustrating the multiroller head during the processing implementing the plastic deformation.

In the embodiment example just illustrated (FIG. 3), the multiroller head TM preferably provides three shaping rollers R1 placed at 120° to make the apparatus self-centering, which guarantee an absolutely uniform and symmetrical distribution of loads and stresses, by reducing to the minimum the deformations and inner tensions which could create asymmetry and/or cracks.

Anyway, it is clear that a number of rollers lower or higher than three can also be used.

Figure 4:
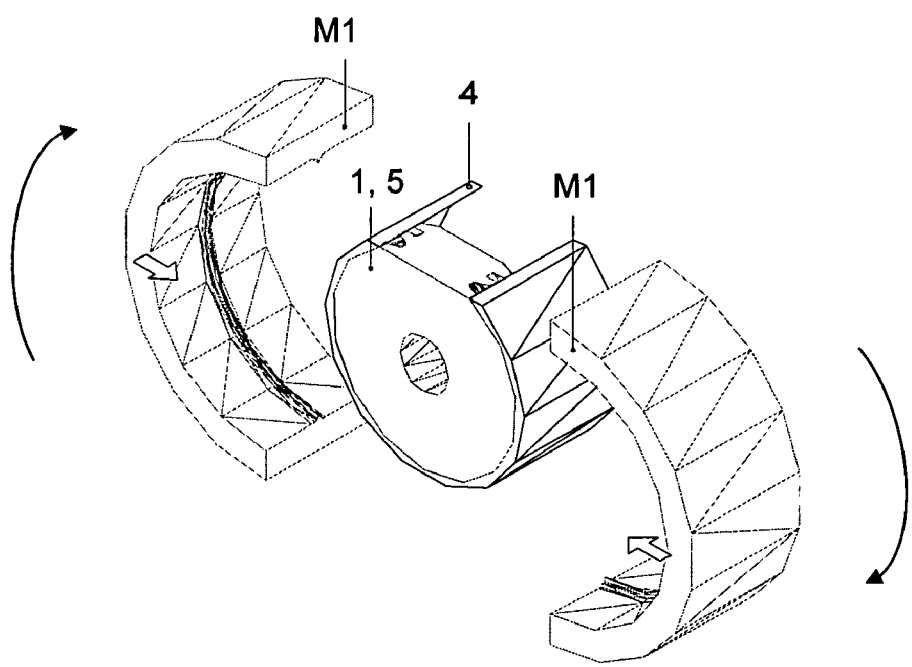
FIG. 4 shows a second way for obtaining the plastic deformation according to the invention.

At last, a variant of the present invention shown in FIG. 4, provides replacing the multiroller head TM by a shaping-ring matrix M1.

With respect to the preceding solution, the plastic deformation is performed by a shaping ring constituted by two half-rings (matrixes) M1, shaped on the inside, which gradually approach, by rotating at predetermined speed, to the tube 4 of the cylinder, by implementing the wished plastic deformation.

An additional variant of the head which performs the plastic deformation according to the invention, as alternative to the shaping rollers (R1), provides a single shaping roller (R1) and one or more thrust rollers to counterbalance the stresses generated by the plastic deformation.

The present invention has been described by referring to an embodiment and some variants thereof, but it is clear that any person skilled in the art could apply modifications and/or replacements equivalent from the technical and/or operating point of view, however comprised within the protective scope of the present industrial invention.

The invention claimed is:

1. A method for manufacturing a jack or hydraulic, pneumatic and/or oleopneumatic cylinder comprising a cylindrical tubular body (4) with a bottom (1) fastened to a first end of the tubular body (4), a head (5) fastened to a second end of the tubular body (4), and a piston (2), integral with a rod (3), configured to slide within an inside of the tubular body (4), comprising:

fastening, in an irremovable way, the head (5) and the bottom (1) to the tubular body (4) without threading and/or welding procedures, by implementing, at the ends of the tubular body (4), a controlled plastic deformation extended to a whole thickness of the tubular body to locally deform the first and second ends by generating on each of the first and second ends at least a circumferential ring radially projecting inwards so as to insert in at least a specific groove (7) arranged, respectively, on the bottom (1) and on the head (5) inserted in the tubular body (4), so as to lock the bottom (1) and the head (5) in situ, wherein said plastic deformation guarantees a mechanical seal of a coupling between the tubular body (4) and the bottom (1), and between the tubular body (4) and the head (5), wherein said controlled plastic deformation is performed by means of mechanical rolling upon said tubular body, said tubular body being free to rotate about a central, longitudinal axis through said tubular body, wherein the mechanical rolling is performed by anchoring the tubular body, preassembled with the head and the bottom, to at least a special multiroller head comprising a plurality of shaping rollers (R1) configured to plastically deform the tubular body, and wherein the rollers (R1) move symmetrically in a radial direction with respect to the tubular body (4), and each of the rollers have a same simultaneous rotating motion to rotate the tubular body (4) about the central longitudinal axis integrally with at least one of the bottom (1) and the head (5) positioned inside the tubular body, the movement of the multiroller head upon the tubular body causing the tubular body to plastically deform by means of an adequate pressure of said shaping rollers (R1) upon an outer surface of the tubular body.

2. The method according to claim 1, wherein, in order to guarantee a seal at each of the bottom (1), of the head (5), the piston (2) and of the rod (3), gaskets (G) are placed in specific grooves (6) arranged on outer cylindrical surfaces of each of the bottom, of the piston, and on outer and inner surfaces of the head.

3. The method according to claim 1,
wherein said plastic deformation of the tubular body (4) involves the whole thickness of the tubular body by generating an outer annular groove and a corresponding inner ring projecting in a radial direction towards the central longitudinal axis of the tubular body, and
wherein the corresponding inner ring is configured to insert into a respective annular groove (7) arranged both on the bottom (1) and on the head (5).

4. The method according to claim 1, comprising the substeps of:
A. Placing appropriate gaskets (G) inside corresponding annular grooves (6) provided on the bottom (1);
B. Inserting the bottom (1) in a predetermined position at the first end of the tubular body (4);
C. Positioning the special multiroller head at the first end of the tubular body (4);
D. Contemporaneously approaching the shaping rollers (R1) to the outer cylindrical surface of the tubular body (4) and performing plastic deformation by means of rolling;
E. Taking the shaping rollers (R1) away from the tubular body;
F. Placing the gaskets (G) inside the corresponding annular grooves (6) provided in the piston (2) integral with the rod (3);
G. Placing additional gaskets (G) inside the corresponding annular grooves (6) provided on outer and inner cylindrical surfaces of the head (5);
H. Inserting the piston (2) inside the tubular body (4) as well as the head (5), already inserted on the rod (3), in a predetermined position thereof at the second end of the tubular body (4);
I. Positioning the special multiroller head at the second end of the tubular body (4);
J. Contemporaneously approaching the shaping rollers (R1) to the outer cylindrical surface of the tubular body (4) and performing another plastic deformation by means of rolling;
K. Taking the shaping rollers (R1) away from the tubular body.

5. The method according to claim 4,
wherein there are two multiroller heads,
wherein the steps A, B, F-H are firstly carried out, and
wherein the subsequent steps C-E, I-K are carried out at the same time.

6. An apparatus for manufacturing a jack or hydraulic, pneumatic and/or oleopneumatic cylinder by means of the process according to claim 4, comprising a multiroller head which comprises at least two opposed rotating shaping rollers (R1) configured to approach the surface of the tubular body (4) in a simultaneous and symmetrical way, said rotating rollers (R1) configured to drive in rotation the tubular body (4).

7. The apparatus according to claim 6, comprising three rotating shaping rollers (R1) placed at 120° to make the apparatus self-centering and configured to guarantee an absolutely uniform and symmetrical distribution of the loads and the stresses by reducing to a minimum inner deformations and tensions which could create asymmetries and/or cracks.

8. The method according to claim 4, wherein the plastic deformation is performed by means of simultaneously rolling the tubular body (4) and the rollers (R1) of the multiroller head.

9. An apparatus for manufacturing a jack or hydraulic, pneumatic and/or oleopneumatic cylinder by means of the process according to claim 1, comprising a single shaping roller (R1) and one or more thrust rollers to counterbalance stresses generated by the plastic deformation, and configured to approach to the surface of the tubular body (4) in a simultaneous and symmetrical way, said single roller (R1) being configured to drive in rotation the tubular body (4).

* * * * *

UNITED STATES PATENT AND TRADEMARK OFFICE
CERTIFICATE OF CORRECTION

PATENT NO.       : 7,614,133 B2                           Page 1 of 1
APPLICATION NO. : 10/514319
DATED            : November 10, 2009
INVENTOR(S)      : Candelieri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Nineteenth Day of October, 2010

David J. Kappos
*Director of the United States Patent and Trademark Office*